United States Patent
Jackson et al.

(10) Patent No.: US 9,330,587 B2
(45) Date of Patent: May 3, 2016

(54) COLOR ADJUSTMENT BASED ON OBJECT POSITIONED NEAR DISPLAY SURFACE

(75) Inventors: Warren Jackson, San Francisco, CA (US); Nelson L Chang, San Jose, CA (US); Henry Sang, Jr., Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 135 days.

(21) Appl. No.: 13/563,517

(22) Filed: Jul. 31, 2012

(65) Prior Publication Data

US 2014/0035893 A1 Feb. 6, 2014

(51) Int. Cl.
  *G09G 5/00* (2006.01)
  *G09G 3/00* (2006.01)
  *G09G 5/02* (2006.01)
  *H04N 9/31* (2006.01)
  *G01J 3/50* (2006.01)

(52) U.S. Cl.
  CPC .............. *G09G 3/002* (2013.01); *G09G 5/00* (2013.01); *G09G 5/02* (2013.01); *H04N 9/3147* (2013.01); *H04N 9/3182* (2013.01); *H04N 9/3194* (2013.01); *G01J 3/505* (2013.01); *G09G 2320/0693* (2013.01); *G09G 2340/06* (2013.01)

(58) Field of Classification Search
  CPC ........... G09G 3/002; G09G 5/00; G09G 5/02; G09G 3/505; G09G 2320/0693; G09G 2340/06; H04N 9/3147; H04N 9/3182; H04N 9/3194
  See application file for complete search history.

(56) References Cited

U.S. PATENT DOCUMENTS

| | | | |
|---|---|---|---|
| 7,663,640 B2 | 2/2010 | Nayar et al. | |
| 2003/0098819 A1* | 5/2003 | Sukthankar et al. | 345/1.1 |
| 2007/0091277 A1* | 4/2007 | Damera-Venkata et al. | 353/69 |
| 2009/0015791 A1* | 1/2009 | Chang et al. | 353/6 |
| 2011/0134332 A1* | 6/2011 | Jaynes et al. | 348/708 |
| 2011/0228104 A1 | 9/2011 | Nelson | |

FOREIGN PATENT DOCUMENTS

JP     2011/078354     * 6/2012     ............. G06K 15/02

OTHER PUBLICATIONS

Brown, M. et al., "Camera-based Calibration Techniques for Seamless Multi-projector Displays," IEEE Transactions on Visualization and Computer Graphics, Mar.-Apr. 2005, 16 pgs., vol. 11, Issue 2, retrieved from < http://vis.uky.edu/~gravity/Research/Yang-research/publications/PAPERS/TVCG05.pdf >.

(Continued)

*Primary Examiner* — Matthew Sim
(74) *Attorney, Agent, or Firm* — Dicke, Billig & Czaja PLLC

(57) ABSTRACT

A display system includes a plurality of individual display devices to collectively generate an image on a display surface. At least one camera captures at least one image of the image on the display surface and captures at least one image of an object positioned near the display surface. A controller automatically adjusts a color of an object appearing in the image on the display surface based on the at least one image of an object.

14 Claims, 4 Drawing Sheets

(56) References Cited

OTHER PUBLICATIONS

Liu, S. et al., "The Color Calibration Across Multi-projector Display," Journal of Signal and Information Processing, May 2011, pp. 53-58, vol. 2, Issue 2, retrieved from < http://www.scirp.org/journal/PaperInformation.aspx?paperID=5057 >.

Gampat, C., "Review: Spyder4elite Color Calibration Tool (and Why it is Too Much for Most People)," May 4, 2012, 13 pgs., retrieved from < http://www.thephoblographer.com/2012/05/04/review-spyder4elite-color-calibration-tool-and-why-it-is-too-much-for-most-people/ >.

* cited by examiner

COLOR ADJUSTMENT BASED ON OBJECT POSITIONED NEAR DISPLAY SURFACE

BACKGROUND

Display of information on large surfaces is of increasing business value, particularly for the presentation of information to groups on one large display. In order to create large information surfaces, the use of multiple projectors or displays (e.g., flat panel displays) calibrated to provide a high resolution and seamless view of information is a cost effective solution.

Large bright high pixel count displays can be used for marketing, shows, entertainment and structured ambient environments (walls). Display systems that reproduce images in tiled positions may provide immersive visual experiences for viewers. With the cost of displays and video streams decreasing rapidly, clustering smaller displays into a single larger display surface becomes increasingly feasible and economical.

DETAILED DESCRIPTION

Figure 1:
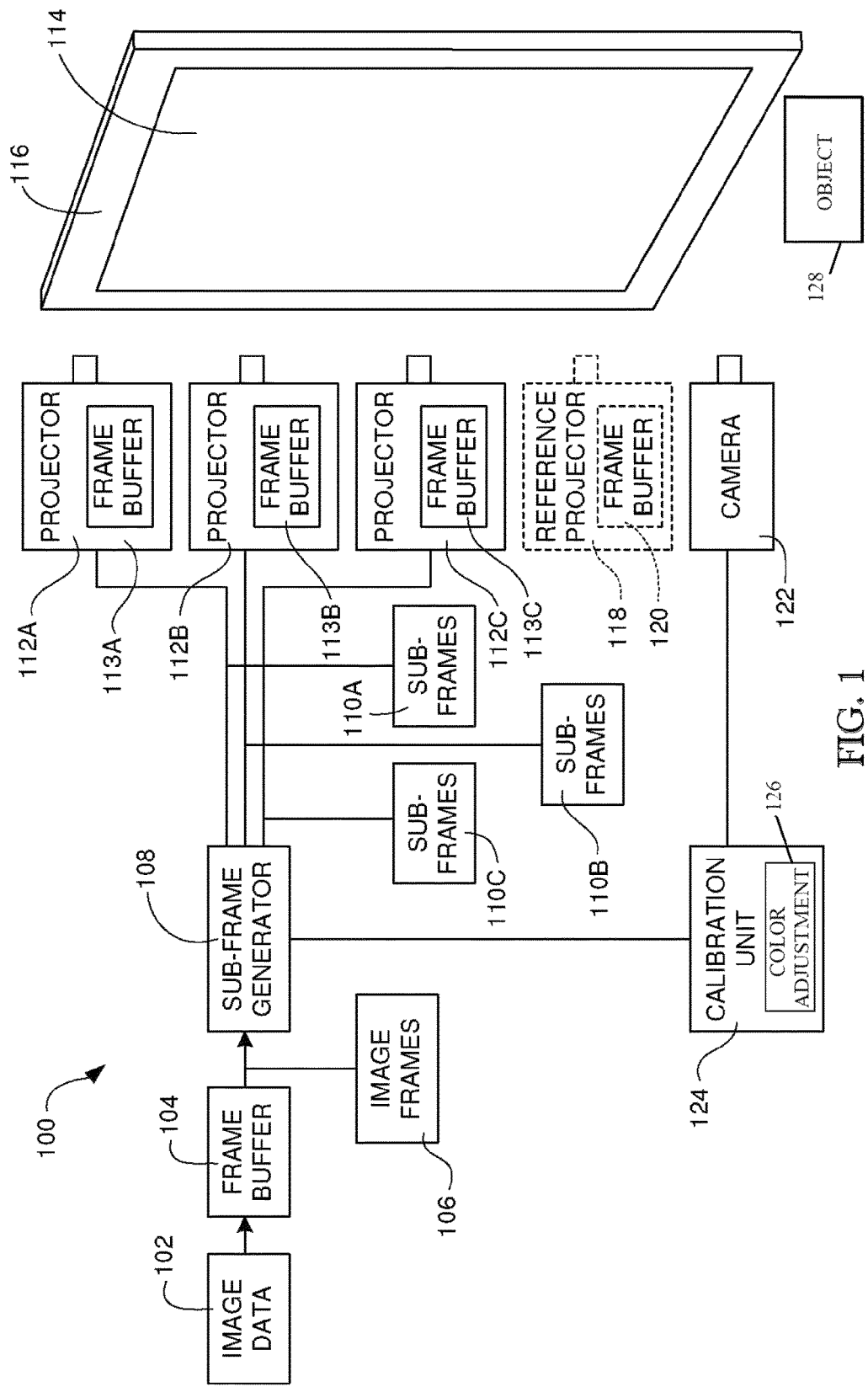
FIG. 1 is a block diagram illustrating a multi-projector image display system configured to adjust a projected color based on an object positioned near the display surface according to one example.

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples of the present disclosure can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

In many applications such as fashion, makeup, interior design, medical imaging, proofing/publishing and marketing, and document design layout, color accuracy is very important. Moreover, the perception of color depends on the ambient lighting. A problem is that the color of a projector or display is seldom accurate. This problem is accentuated with multiple projector/display viewing surfaces as each projector/display can have a different color alignment. The contrast between such patches is particularly apparent and distorts the color perception in unknown and complex ways.

In some display systems, the true color gamut of neither the aligning camera nor of the projectors/displays is usually known. So an alignment is done to maximize the color gamut or equivalently the hue, saturation, and value. The actual color of the display can reflect the color misalignment of both the camera and the projectors/displays. The color is also typically restricted by the most limiting values of the projectors. Moreover, the color of ambient light is typically ignored by turning off the ambient light.

Some existing calibration techniques help to ensure that the multiple projector/displays are color consistent among one another using a calibration camera, but not necessarily color accurate in absolute terms. Color shifts due to the screen materials, ambient light, and calibration color biases are not typically accounted for.

One implementation is directed to a multiple projector/display system that can display information in an absolute color calibrated mode so that the color is accurately reproduced for the viewer. In one implementation, an object or color sample of known color is placed within the field of view of an alignment camera system along with the projector screen/display. The system according to one implementation adjusts the color gamut of the combined projector/display to present colors which match the object or color sample. One implementation is directed to a means for calibrating a multiple projector/display system to display accurate colors and correct for the effects of ambient light color bias. One implementation is directed to a system for accurate color calibration of multiprojector/multipanel systems with large area viewing surfaces.

FIG. 1 is a block diagram illustrating a multi-projector image display system 100 configured to adjust a projected color based on an object 126 positioned near the display surface according to one example. The image display system 100 processes image data 102 and generates a corresponding displayed image 114. The displayed image 114 is defined to include any pictorial, graphical, or textural characters, symbols, illustrations, or other representations of information.

In one embodiment, the image display system 100 includes an image frame buffer 104, a sub-frame generator 108, projectors 112A-112C (collectively referred to as projectors 112), camera 122, and a calibration unit 124. The image frame buffer 104 receives and buffers image data 102 to create image frames 106. The sub-frame generator 108 processes the image frames 106 to define corresponding image sub-frames 110A-110C (collectively referred to as sub-frames 110). In one embodiment, for each image frame 106, the sub-frame generator 108 generates one sub-frame 110A for projector 112A, one sub-frame 110B for projector 112B, and one sub-frame 110C for projector 112C. The sub-frames 110A-110C are received by the projectors 112A-112C, respectively, and stored in the image frame buffers 113A-113C (collectively referred to as image frame buffers 113), respectively. The projectors 112A-112C project the sub-frames 110A-110C, respectively, onto the target surface 116 to produce the displayed image 114 for viewing by a user.

The image frame buffer 104 includes memory for storing image data 102 for one or more image frames 106. Thus, the image frame buffer 104 constitutes a database of one or more image frames 106. The image frame buffers 113 also include memory for storing sub-frames 110. Examples of image frame buffers 104 and 113 include non-volatile memory (e.g., a hard disk drive or other persistent storage device) and may include volatile memory (e.g., random access memory (RAM)).

The sub-frame generator 108 receives and processes image frames 106 to define a plurality of image sub-frames 110. The sub-frame generator 108 generates sub-frames 110 based on the image data in image frames 106. In one embodiment, the sub-frame generator 108 generates image sub-frames 110 having a resolution that matches the resolution of the projectors 112, which is less than the resolution of image frames 106 in one embodiment. The sub-frames 110 each include a plurality of columns and a plurality of rows of individual pixels representing a subset of an image frame 106.

The projectors 112 receive image sub-frames 110 from the sub-frame generator 108 and, in one embodiment, simultaneously project the image sub-frames 110 onto the target surface 116 at overlapping and/or spatially offset positions to produce the displayed image 114. In one embodiment, the display system 100 is configured to give the appearance to the human eye of high-resolution displayed images 114 by displaying overlapping lower-resolution sub-frames 110 from multiple projectors 112. These overlapping sub-frames can be spatially shifted or have arbitrary geometric transformations with respect to one another. In one embodiment, the projection of overlapping sub-frames 110 gives the appearance of enhanced resolution (i.e., higher resolution than the sub-frames 110 themselves). Approaches have been developed for determining appropriate values for the sub-frames 110 so that the resulting displayed image 114 produced by the projected sub-frames 110 is close in appearance to how the high-resolution image (e.g., image frame 106) from which the sub-frames 110 were derived would appear if displayed directly.

It will be understood by a person of ordinary skill in the art that the functions performed by the sub-frame generator 108 may be implemented in hardware, software, firmware, or any combination thereof. The implementation may be via a microprocessor, programmable logic device, or state machine. Components of the system may reside in software on one or more computer-readable media devices. The term computer-readable media as used herein is defined to include any kind of memory, volatile or non-volatile, such as floppy disks, hard disks, CD-ROMs, flash memory, read-only memory, and random access memory.

Also shown in FIG. 1 is reference projector 118 with an image frame buffer 120. The reference projector 118 is shown in hidden lines in FIG. 1 because, in one embodiment, the projector 118 is not an actual projector, but rather is a hypothetical high-resolution reference projector that is used in an image formation model for generating optimal sub-frames 110. In one embodiment, the location of one of the actual projectors 112 can be defined to be the location of the reference projector 118. The display system 100 can also include a camera 122 and a calibration unit 124, which can be used to automatically determine a geometric mapping between each projector 112 and the reference projector 118.

The image display system 100 can include hardware, software, firmware, or a combination of these. In one embodiment, one or more components of the image display system 100 (e.g. the frame buffer 104, sub-frame generator 108 and calibration unit 124) are included in a computer, computer server, or other microprocessor-based system capable of performing a sequence of logic operations. Such a system is generally referred to herein as a "controller" for the multi-projector system. In addition, processing can be distributed throughout the system with individual portions being implemented in separate system components, such as in a networked or multiple computing unit environment (e.g. clustered computers).

In one embodiment, camera 122 is pre-calibrated to account for differences from an underlying mathematical model. In one embodiment, an amount of lens distortion for each calibration camera, as well as the relative orientation and position of each camera, is calculated using a known calibration pattern or chart. Once computed, the control system can precompensate each subsequently captured image to account for the lens distortion and relative geometry. The color space of the camera can also be corrected by pre-calibrating the camera using a device like a spectrophotometer, and then pre-compensating captured images with color transformations.

In another embodiment, the vignetting effect is estimated and eliminated for each calibration camera 122. As will be appreciated by those of skill in the art, light intensity detection can vary across the field of view of a given camera. In particular, there can be a reduction in light intensity detection at the margins of the image. It is desirable to compensate for this "vignetting" effect (also called a luminance profile or intensity profile) for each camera. This compensation is often performed by using a flat white physical target of known intensity characteristics. By viewing that pattern with each calibration camera 122 and measuring the luminance intensity variation of the resulting image via the calibration unit 124, this allows the system to estimate the intensity vignetting based upon spatial variation of intensity detection across the calibration pattern image. Once the intensity variation is known, the control system can post-compensate each subsequently captured image, so that all images captured by that camera will not suffer from the vignetting effect. In this way, the camera(s) become pre-calibrated to give accurate comparative intensity readings.

Whether the calibration camera(s) 122 are pre-calibrated or not, the next step is to specify target characteristics for the projectors 112. In some cases, this step involves using modeling and measurement steps. Examples of these modeling and measurement steps include calibrating the projection brightness to be as uniform as possible. In one embodiment, the image pipeline for the multi-projector system uses an image formation model and automatic measurement steps via feedback through the calibration camera(s) 122, including measuring the inter-projector geometry, luminance, color, black offset, etc. These modeling and measurement steps are outlined in N. Damera-Venkata, N. L. Chang, J. M. DiCarlo, "A Unified Paradigm for Scalable Multi-Projector Displays," IEEE Transactions on Visualization and computer Graphics, November-December 2007, and in U.S. Pat. Nos. 7,306,341, and 7,443,364, and United States Patent Application Publication Nos. 2007/0091277, 2007/0097334, 2008/0002160, 2008/0024469, 2008/0024683, and 2008/0143978, the disclosures of which are incorporated by reference herein.

As described in the above references, a series of patterns are projected by a set of projectors and subsequently captured by the camera(s) to estimate the calibration parameters with respect to the imaging model. In one embodiment, based on the linearity of light, the model is a summation of each projector's light output, after undergoing any geometric transformations, resampling, luminance variations, color gamut changes, as well as inherent light leakage (or black offset). Once estimated, the calibration parameters facilitate an accurate prediction of the projectors' final image. As described in the above references, desired target parameters (e.g. luminance profile for the entire projector system, color gamut, etc) are chosen for the set of projectors, and rendering parameters for each projector are optimized based on the desired target parameters. The rendering parameters encapsulate the information used to make the resulting image appear as though the output came from a single projector (i.e., so that the output appears seamless and achieves certain desired image properties). For example, this approach helps ensure that the geometry, luminance, and color of the resulting image are consistent throughout the set of projectors.

Once the target characteristics for the projectors have been specified, the next step is to determine the target parameters (brightness, color, etc) for the projectors to ensure consistent rendering. In other words, projection values for brightness, color, etc. are assigned to the projectors so that the final projected images are consistent with respect to these parameters. Normally, with multiple projectors, there can be brightness discontinuities and seams, etc. In order to make the output from multiple individual projectors appear as if it came from a single projector, one with a particular smoothly varying luminance surface/profile, the target luminance surface of one subset of projectors may be substantially brighter than one obtained for a second subset of projectors, so this is also factored in during calibration.

As another example, the system can examine the chromaticity of the projectors in various sub-groups and take the intersection gamut of the color space of all the projectors in each sub-group to ensure that all content can be feasible in color. After the above measuring and modeling steps are performed for each sub-group, the resulting calibration parameters are adjusted so that the color gamut of one sub-group does not vary significantly from a second one, thereby ensuring consistency across sub-groups. The calibration camera captures these images, and the calibration unit analyzes the chromaticity of the respective projector to determine the full range of color values that the projector can produce. When this is done for all projectors, the intersection gamut represents the full range of color values that all projectors can produce. Information regarding the intersection gamut of available colors can be used to allow the system to select color values that are within the available color space for any projection color values that may fall outside that space. This allows a color that cannot be accurately rendered by all projectors to be adjusted to the closest color within the common color space, so that all sub-groups project the same color for a given color value.

Following the determination of the target parameters for the different sub-groups, the next step is to compute the rendering parameters for the entire system. The multi-projector system computes projection differences among projectors and then solves for the parameters used to adjust each projector so that when combined, the final result looks seamless and exhibits the desired target characteristics. In one embodiment, a training algorithm is executed to efficiently compute these rendering parameters. This process is outlined in U.S. Patent Application Publication No. 2008/0024469.

In the next step, appropriate display content is sent to each projector at display time. When it is desired to display some content, the computed rendering parameters are applied to every desired frame to determine how to adjust each projector's image so that the resulting image achieves the desired characteristics.

Display system 100 according to one implementation is also configured to adjust at least one projected color based on an object 128 positioned near the target surface 116. In the illustrated implementation, calibration unit 124 includes a color adjustment unit 126 for generating color adjustment information based on images of the object 128 and of the target surface 116 captured by camera 122.

Figure 2:
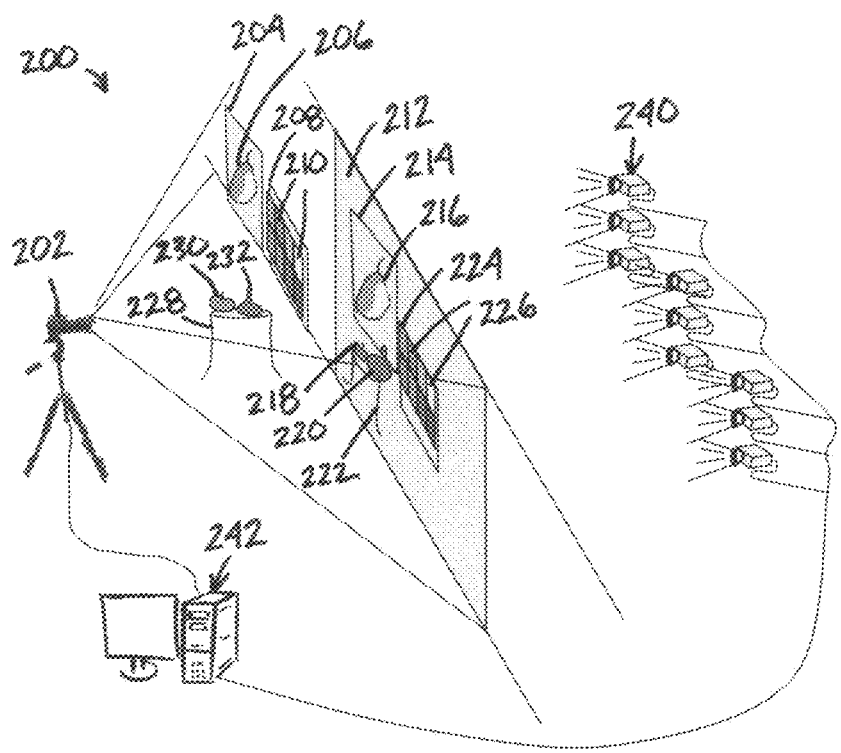
FIG. 2 is a diagram illustrating a multi-projector image display system configured to display accurate colors and correct for the effects of ambient light color bias according to one example.

FIG. 2 is a diagram illustrating a multi-projector image display system 200 configured to display accurate colors and correct for the effects of ambient light color bias according to one example. System 200 includes a calibration camera 202, a display surface 212, a plurality of projectors 240, and a control system 242. In the illustrated embodiment, the plurality of projectors 240 includes nine rear-projection devices, which collectively produce a displayed image on display surface 212. In one embodiment, display system 200 operates in substantially the same manner as display system 100 (FIG. 1), but is also configured to perform a color calibration based on actual objects positioned within the field of view of camera 202. Although the embodiment shown in FIG. 2 includes rear-projection devices 240, it will be understood that the techniques described herein are also applicable to front-projection devices and display systems that use multiple, tiled flat panel displays.

As shown in FIG. 2, three sets of objects are positioned within the field of view of camera 202, and the display surface 212 is also positioned within the field of view of camera 202. The three sets of objects include: (1) a picture 204 of a fruit 206; (2) a panel 208 with a plurality of colored rectangles 210 of various colors; and (3) a table 228 with two colored food items 230 and 232 of different colors placed thereon. Images of the three sets of objects are also projected onto display surface 212 using projectors 240. The overall image projected onto display surface 212 includes: (1) a projected image 214 of a fruit 216 corresponding to picture 204 of fruit 206; (2) a projected image 224 of a plurality of colored rectangles 226 corresponding to panel 208 with colored rectangles 210; and (3) a projected image of a table 222 with two colored food items 218 and 220 corresponding to table 228 with two colored food items 230 and 232.

In one embodiment, color accuracy is obtained in the context of image sensor based calibration of the multiprojector system 200. In system 200, camera 202 observes display surface 212, which is illuminated by overlapping projector outputs (or an array of tiled flat panel displays). By sending a series of geometric patterns to the various projectors 240 and observing the results using camera 202, the correspondence between projector pixels and the corresponding positions on the actual display surface 212 is learned. By sending different intensity and color signals to the projectors 240, the relation between the camera 202 observed color and the projector 240 color can be determined.

Because the camera 202 and the projectors 240 both have unknown color biases, it is difficult to get a true color representation. However, in the illustrated embodiment, the color is set by including actual color objects (as opposed to projected images of objects) into the field of view of the camera 202 during calibration. Such objects include actual objects to be accurately color rendered or known color patches spanning the color space of interest. In the illustrated embodiment, the actual color objects include objects 206, 210, 230, and 232. The calibration process then consists of control system 242 automatically matching the color of the actual object or sample recorded by the calibration camera 202 and the projected color of the corresponding projected object as recorded by the calibration camera 202. In one embodiment, a large number of different colors are used for the actual objects, and a color model is generated based on the matching of the colors of the actual objects recorded by the calibration camera 202 and the projected colors of the corresponding projected objects as recorded by the calibration camera 202. The color model is then used by control system 242 to accurately represent the color of unknown objects.

System 200 according to one embodiment solves a number of visual tasks. For example, there is no need to calibrate the camera 202 or the color samples or objects because both the projected and actual color samples/objects use the same uncalibrated camera 202. In addition, inaccurate color due to ambient lighting can be corrected by keeping the viewing light on during calibration.

Figure 3:
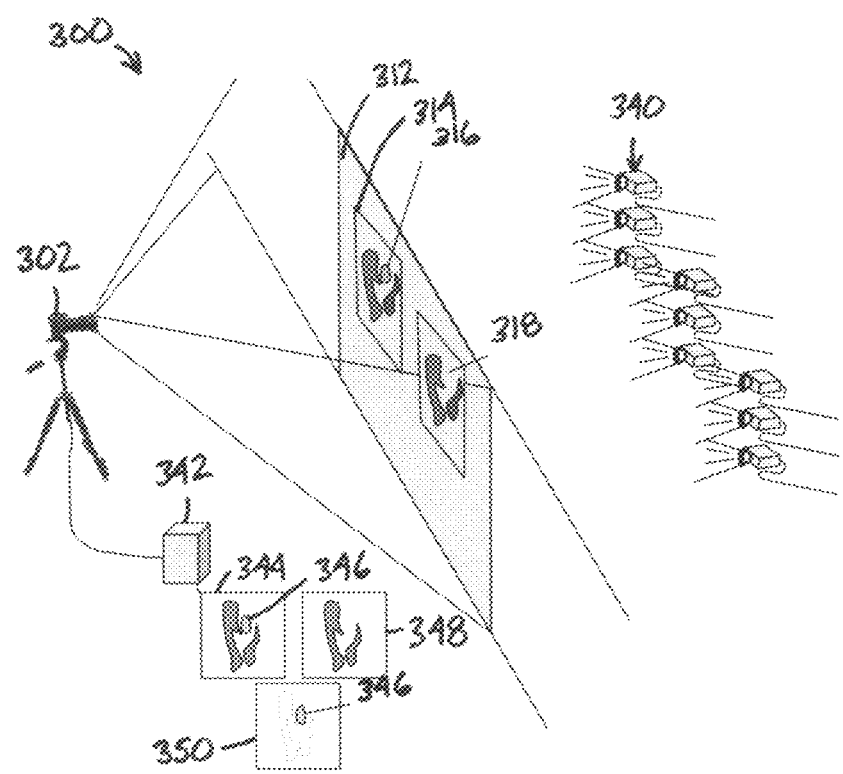
FIG. 3 is a diagram illustrating a multi-projector image display system optimized for a particular task by maximizing the contrast between image features according to one example.

FIG. 3 is a diagram illustrating a multi-projector image display system 300 optimized for a particular task by maximizing the contrast between image features according to one example. System 300 includes a calibration camera 302, a display surface 312, a plurality of projectors 340, and a model of a human vision system 342 to serve as an automated human observer rather than using actual people for visual tasks. One could use human subjects as well to optimize the performance on the given visual task. In one embodiment, system 300 also includes a control system 242 (FIG. 2), which is not shown in FIG. 3 to simplify the figure. In the illustrated embodiment, the plurality of projectors 340 includes nine rear-projection devices, which collectively produce a displayed image on display surface 312. In one embodiment, display system 300 operates in substantially the same manner as display system 100 (FIG. 1), but is also optimized for a particular task by maximizing the contrast between image features. Although the embodiment shown in FIG. 3 includes rear-projection devices 340, it will be understood that the techniques described herein are also applicable to front-projection devices and display systems that use multiple, tiled flat panel displays.

As shown in FIG. 3, the display system 300 is projecting two images 314 and 318 onto the display surface 312. The first image 314 is a simplified representation of a portion of the human body with a tumor 316 appearing in the image. The second image 318 is a simplified representation of the same portion of the human body without a tumor appearing in the image.

The large area display settings of the display system 300 are optimized in one embodiment for a particular task by maximizing the contrast between various image task possibilities. In one embodiment, the display characteristics are modified to magnify differences, and make certain features more visible and other features less visible. For example, if the large display surface 312 is used to identify tumors, as shown in FIG. 3, the system 300 can adjust the parameters to maximize the separability of the two images 314 and 318. In conjunction with the human vision model 342, the system 300 can adjust the large display to maximize a just noticeable difference (JND) difference map. The just noticeable difference is the minimum stimulus at which the observer makes a 50% error on a task. The smaller such minimum is, the better the display for the visual task of recognition of said stimulus. Then the display 300 would be optimized for particular image recognition based tasks.

FIG. 3 also shows images 344 and 348, which correspond to images 314 and 318, respectively. Image 344 includes tumor 346. Images 344 and 348 are projected onto display surface 312 to produce projected images 314 and 318, respectively. Image 350 is a resulting contrast enhanced image in which the contrast between the tumor 346 and the surrounding tissue is increased to make the tumor 346 more noticeable to the human eye. Image 350 may be projected onto the display surface 312.

In one embodiment, a set of training images are used by display system 300 to identify display characteristics that can be used to enhance the visibility of a certain feature (e.g., a tumor), and then these display characteristics are used on other images to help make a determination of whether the certain feature is present in those images.

The display 300 can be optimized for a customer's applications and sold based on task performance optimization. As a specific example, the multiprojector system 300 could be sold to a hospital for their tumor board meetings where a group of specialists examine a patient's cancer data, including various medical images and make a treatment recommendation. Such a multiprojector system 300 could have a setting which optimizes the visual appearance of particular medical conditions in order to maximize chances of detecting the medical conditions.

Figure 4:
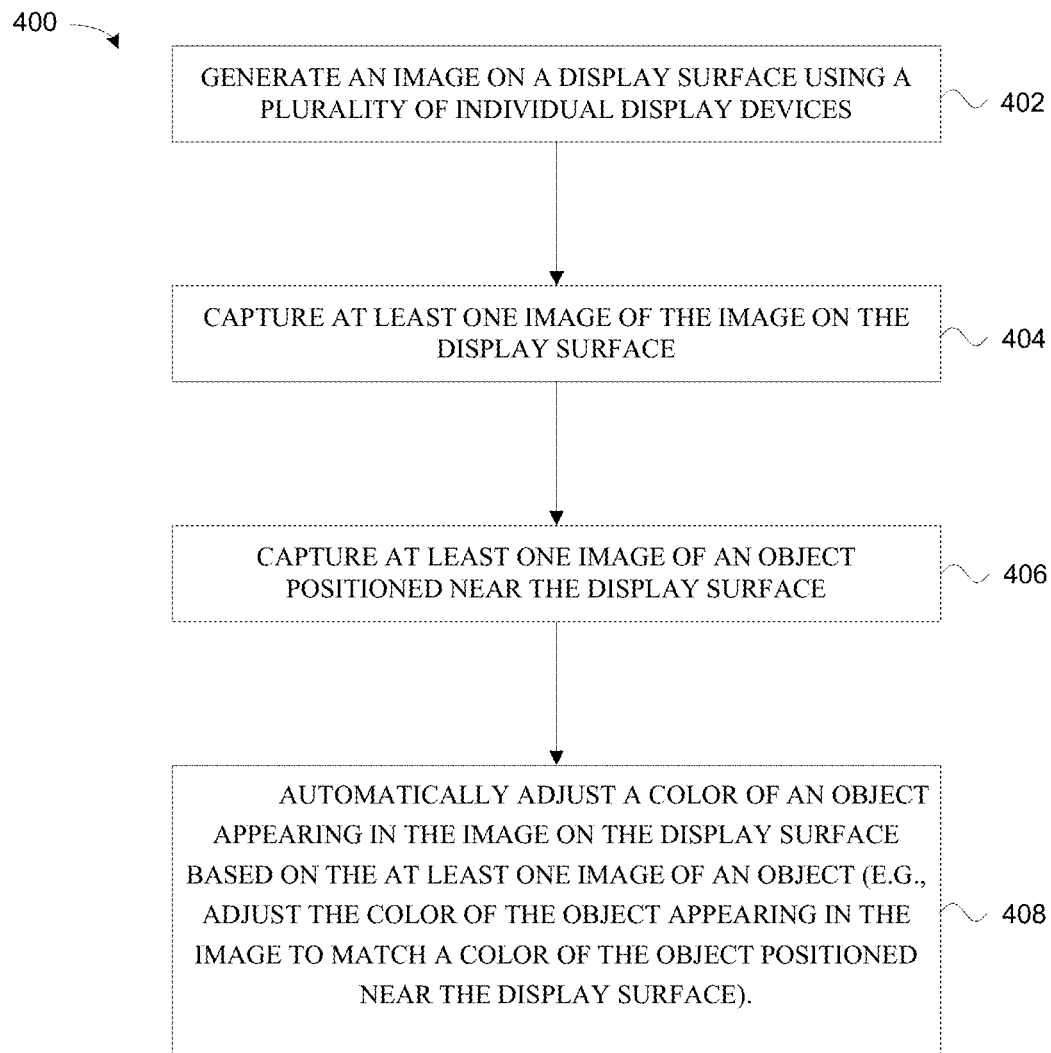
FIG. 4 is a diagram illustrating a method of displaying information with a display system according to one example.

FIG. 4 is a diagram illustrating a method 400 of displaying information with a display system according to one example. In one embodiment, display system 100, display system 200, or display system 300 is configured to perform method 400. At 402 in method 400, the display system generates an image on a display surface using a plurality of individual display devices. At 404, the display system captures at least one image of the image on the display surface. At 406, the display system captures at least one image of an object positioned near the display surface. At 408, the display system automatically adjusts a color of an object appearing in the image on the display surface based on the at least one image of an object. In one embodiment, the display system at 408 adjusts the color of the object appearing in the image to match a color of the object positioned near the display surface.

In one embodiment of method 400, the display devices are flat panel display devices in a tiled array. In another embodiment, the display devices are projectors. In one form of this embodiment, the display devices are projectors that project overlapping sub-frames onto the display surface to generate the image on the display surface.

In one embodiment, method 400 further includes one or more of the following: automatically determining a geometric mapping between each of the display devices and the display surface based at least in part on the at least one image of the display surface; automatically calibrating a display brightness of the display devices to be substantially uniform based at least in part on the at least one image of the display surface; and automatically calibrating displayed colors of the display devices to be substantially uniform based at least in part on the at least one image of the display surface.

One embodiment is directed to a display system that includes a plurality of individual display devices to collectively generate an image on a display surface. The display system includes at least one camera to capture at least one image of the image on the display surface and capture at least one image of an object positioned near the display surface. The display system also includes a controller to automatically adjust a color of an object appearing in the image on the display surface based on the at least one image of an object (e.g., adjust the color of the object appearing in the image to match a color of the object positioned near the display surface).

In one embodiment, the display devices are flat panel display devices in a tiled array. In another embodiment, the display devices are projectors. In one form of this embodiment, the display devices are projectors that project overlapping sub-frames onto the display surface to generate the image on the display surface.

The at least one camera in the display system according to one embodiment comprises a calibration camera that is configured for one or more of the following: automatically determining a geometric mapping between each of the display devices and the display surface; automatically calibrating a display brightness of the display devices to be substantially uniform; and automatically calibrating displayed colors of the display devices to be substantially uniform.

Another embodiment is directed to a display system, which includes a plurality of individual display devices to collectively generate an image on a display surface. The display system includes at least one camera to capture at least one image of the image on the display surface. The display system also includes a controller to automatically adjust display characteristics of the image on the display surface to maximize performance on a visual task. In one form of this embodiment, the visual task is detection of just noticeable stimuli. In one embodiment, just noticeable differences for the visual task are determined by a human vision model.

One illustrative implementation for determining the just noticeable difference of a recognition task would be to determine the presence or absence of an important visual stimuli in a viewer forced choice experiment. As the strength of the stimuli is decreased, the point at which the error rate for detection is 50% is the just noticeable difference. Using the techniques described herein, the parameters of the display for the greatest accuracy for the weakest stimuli can be set, thereby optimizing the display for the task of recognizing the stimuli. The performance on other visual tasks can likewise be optimized by the techniques described herein. In order to automate and speed up the optimization process, it may be beneficial to use human vision based computer observers rather than actual observers. The case of matching of color discussed previously is a particular example of a visual task optimized by techniques disclosed herein.

One embodiment provides an efficient method to achieve accurate color or intensity calibration of a projector system. The techniques described herein can also be used with a single projector/display. In the simplest case, it does not involve calibration of the camera or the projectors. However, because the human eye has different spectral sensitivity curves than the camera, CIE color measurements of the camera might help the color accuracy in certain situations. The projector/display can be optimized for specific tasks and various ambient lighting conditions.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A display system, comprising:
a plurality of individual projectors to collectively generate an image by projecting a plurality of overlapping sub-frames on a display surface, wherein the collectively generated image is formed based on a hypothetical high-resolution reference projector, wherein each of the plurality of overlapping sub-frames is generated based on geometric mappings between the plurality of individual projectors and the hypothetical high-resolution reference projector, wherein the plurality of overlapping sub-frames include overlapping regions and non-overlapping regions;
at least one calibration camera to capture at least one image of the collectively generated image on the display surface and capture at least one image of an actual object that is separate from the display surface and the collectively generated image on the display surface and is positioned near the display surface, wherein the collectively generated image is a training image including at least one desired image feature and a plurality of other image features, wherein the at least one image is captured from the training image on the display surface; and
a controller to:
determine the geometric mappings between the plurality of individual projectors and the hypothetical high-resolution reference projector based on the at least one image of the collectively generated image;
determine brightness and color settings of each of plurality of individual projectors to reduce discontinuities in the overlapping regions of the plurality of overlapping sub-frames;
automatically adjust a color of an object appearing in the collectively generated image on the display surface based on the at least one image of the actual object;
automatically determine, based on the at least one image, display characteristics associated with a just noticeable difference between the at least one desired image feature and the plurality of other image features, wherein the just noticeable difference is determined based on a human vision model representing a human observer; and
adjust the plurality of individual projectors using the determined display characteristics.

2. The display system of claim 1, wherein the plurality of projectors are front-projection devices.

3. The display system of claim 1, wherein the plurality of projectors are rear-projection devices.

4. The display system of claim 1, wherein the controller adjusts the color of the object appearing in the image to match a color of the actual object positioned near the display surface.

5. The display system of claim 1, wherein the controller is further to determine the color settings of each of plurality of individual projectors based on a intersection of the range of color values that can be produced by each of plurality of individual projectors.

6. The display system of claim 1, wherein the just noticeable difference is associated with a 50% error rate of the human vision model in recognizing the at least one desired image feature in the plurality of captured images.

7. The display system of claim 1, wherein the at least one desired image feature is a tumor image.

8. A method of displaying information with a display system, the method comprising:
generating a collectively produced image on a display surface by projecting a plurality of overlapping sub-frames using a plurality of individual projectors, wherein the collectively produced image is formed based on a hypothetical high-resolution reference projector, wherein each of the plurality of overlapping sub-frames is generated based on geometric mappings between the plurality of individual projectors and the hypothetical high-resolution reference projector, wherein the plurality of overlapping sub-frames include overlapping regions and non-overlapping regions;
capturing, using a calibration camera, at least one image of the collectively produced image on the display surface;
capturing, using the calibration camera, at least one image of an actual object that is separate from the display surface and the collectively produced image on the display surface and is positioned near the display surface, wherein the collectively generated image is a training image including at least one desired image feature and a plurality of other image features, wherein the at least one image is captured from the training image on the display surface;
determining the geometric mappings between the plurality of individual projectors and the hypothetical high-resolution reference projector based on the at least one image of the collectively produced image;

determining brightness and color settings of each of plurality of individual projectors to reduce discontinuities in the overlapping regions of the plurality of overlapping sub-frames;

automatically adjusting a color of an object appearing in the collectively produced image on the display surface based on the at least one image of the actual object;

automatically determining, based on the at least one image, display characteristics associated with a just noticeable difference between the at least one desired image feature and the plurality of other image features, wherein the just noticeable difference is determined based on a human vision model representing a human observer; and adjusting the plurality of individual projectors using the determined display characteristics.

9. The method of claim 8, wherein the plurality of projectors are front-projection devices.

10. The method of claim 8, wherein the plurality of projectors are rear-projection devices.

11. The method of claim 8, and further comprising:
adjusting the color of the object appearing in the image to match a color of the actual object positioned near the display surface.

12. The method of claim 8, wherein determining the color settings of each of plurality of individual projectors comprises determining an intersection of the range of color values that can be produced by each of plurality of individual projectors.

13. The method of claim 8, wherein the just noticeable difference is associated with a 50% error rate of the human vision model in recognizing the at least one desired image feature in the plurality of captured images.

14. The method of claim 8, wherein the at least one desired image feature is a tumor image.

* * * * *